(12) United States Patent
Lee

(10) Patent No.: US 8,714,837 B2
(45) Date of Patent: May 6, 2014

(54) OPTICAL FIBER CONNECTOR

(75) Inventor: Chun-Sheng Lee, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 463 days.

(21) Appl. No.: 13/116,020

(22) Filed: May 26, 2011

(65) Prior Publication Data

US 2012/0155886 A1    Jun. 21, 2012

(30) Foreign Application Priority Data

Dec. 20, 2010    (CN) .......................... 2010 2 0669150

(51) Int. Cl.
*G02B 6/42* (2006.01)
(52) U.S. Cl.
CPC ........................................ *G02B 6/42* (2013.01)
USPC ............................................. 385/88; 385/139
(58) Field of Classification Search
None
See application file for complete search history.

(56) References Cited

U.S. PATENT DOCUMENTS

| | | | | |
|---|---|---|---|---|
| 5,528,409 | A | * | 6/1996 | Cucci et al. ..................... 398/15 |
| 6,301,400 | B1 | | 10/2001 | Sanders |
| 8,180,225 | B2 | * | 5/2012 | Werthen et al. ............... 398/171 |
| 8,358,893 | B1 | * | 1/2013 | Sanderson et al. ............ 385/101 |
| 2005/0226625 | A1 | * | 10/2005 | Wake et al. .................... 398/115 |

* cited by examiner

*Primary Examiner* — Michelle R Connelly
(74) *Attorney, Agent, or Firm* — Novak Druce Connolly Bove + Quigg LLP

(57) ABSTRACT

An optical fiber connector includes a circular polarizer, an optical electrical converter, and a transceiving module. The circular polarizer receives external optical signals from an optical fiber and divides the received optical signals into first optical signals and second optical signals. The optical electrical converter converts the first optical signals into first electrical signals. The transceiving module receives third electrical signals from ports of an optical communication device, and includes an optical electrical converting circuit and an electrical optical converting circuit. The optical electrical converting circuit converts the second optical signals into second electrical signals and transmits the second electrical signals to the optical communication device. The electrical optical converting circuit converts the third electrical signals into third optical signals and transmits the third optical signals to the optical fiber. The first electrical signals are used to drive the transceiving module.

8 Claims, 3 Drawing Sheets

OPTICAL FIBER CONNECTOR

BACKGROUND

1. Technical Field

Embodiments of the present disclosure relate to optical fiber communication technology, and more particularly to an optical fiber connector.

2. Description of Related Art

Optical fiber greatly improves transmission speed between most communication devices. Each optical fiber connector needs 1-5 watt power to drive optical signal transmission according to transceived content. For example, a small form-factor pluggable exchange with 48 ports needs divide 48 watt power for the 48 ports to support an optical fiber connector which connects to the small form-factor pluggable exchange. Meanwhile, the strength of optical signals received by the optical fiber connector from a connected optical fiber is a large excess of need, which leads energy waste. There remains a heretofore unaddressed need to overcome the limitations described.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

Figure 1:
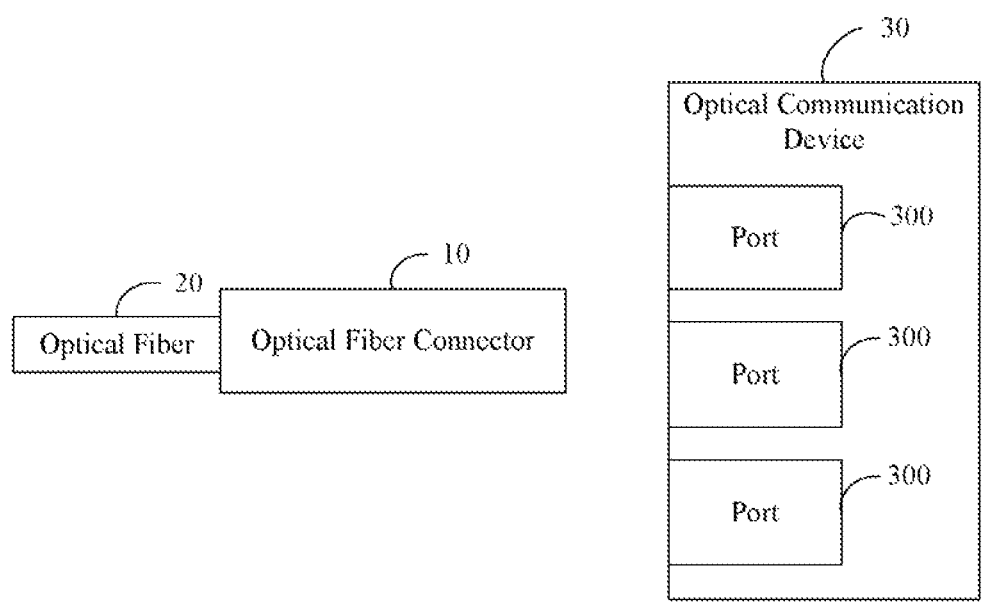
FIG. 1 is a schematic diagram of functional modules of an optical fiber connector of one embodiment of the present disclosure.

FIG. 1 is a schematic diagram of application environment of an optical fiber connector 10 of one embodiment of the present disclosure. In one embodiment, one end of the optical fiber connector 10 connects to an optical fiber 20 to receive optical signals. Another end of the optical fiber connector 10 connects to ports 300 of an optical communication device 30 to achieve transmission function between the optical fiber 20 and the optical communication device 30. In one embodiment, the optical fiber connector 10 includes small form-factor pluggable (SFP) modules, 10-gigabit small form-factor pluggable (XFP) modules, 10-gigabit Ethernet transceiver package (XENPAK) modules, or other modules to connect to the ports 300.

In one embodiment, the optical fiber connector 10 converts the optical signals received from the optical fiber 20 into electrical signals and transmits the converted electrical signals to the optical communication device 30. Meanwhile, the optical fiber connector 10 converts electrical signals received from the optical communication device 30 into optical signals and transmits the converted optical signals to an optical network by the optical fiber 20.

The optical fiber connector 10 may be a single-fiber bi-directional connector or a two-fiber bi-directional connector. In one embodiment, the single-fiber bi-directional optical fiber connector 10 connects one fiber 20 to the ports 300 of the optical communication device 30, and transmits and receives the optical signals with different wavelengths by the one fiber 20. In another embodiment, the two-fiber bi-directional optical fiber connector 10 connects two fibers 20 to the ports 300 of the optical communication device 30, transmits the optical signals by one of the two fibers 20, and receives the optical signals by another one of the two fibers 20.

Figure 2:
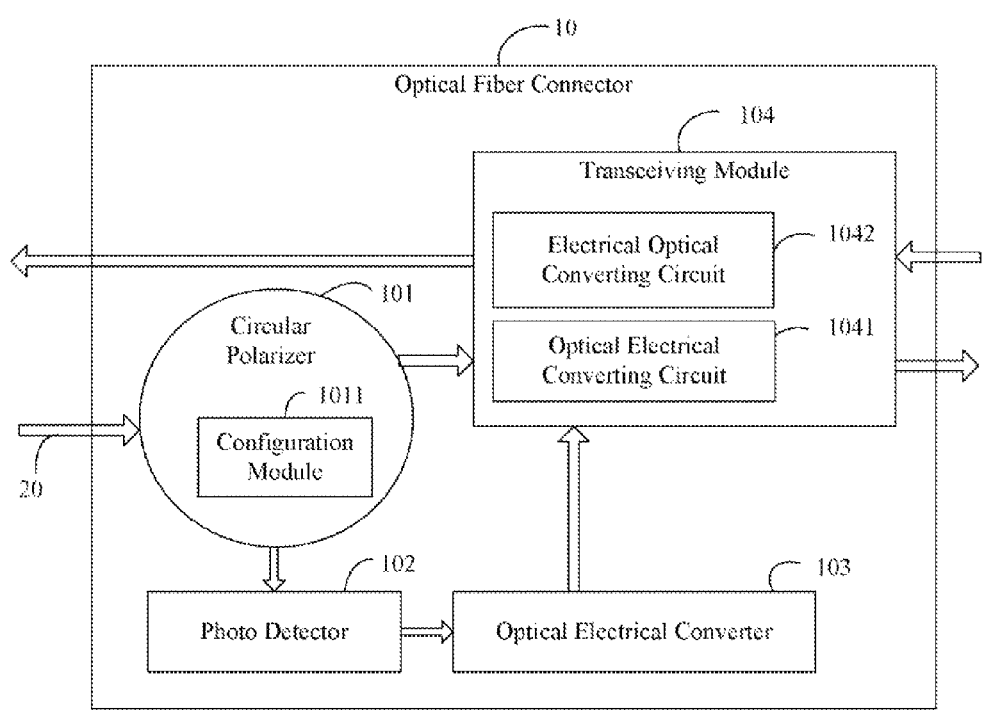
FIG. 2 is a schematic diagram of functional modules of an optical fiber connector of one embodiment of the present disclosure.

FIG. 2 is a schematic diagram of application functional modules of the optical fiber connector 10 of one embodiment of the present disclosure. In one embodiment, the optical fiber connector 10 includes a circular polarizer 101, a photo detector 102, an optical electrical converter 103, and a transceiving module 104.

The circular polarizer 101 receives external optical signals from the optical fiber 20 and suitably divides the received optical signals to first optical signals and second optical signals. In one embodiment, the first optical signals are converted into electrical signals to drive signal transmission of the transceiving module 104. The second optical signals carry transmitted data.

In one embodiment, the circular polarizer 101 comprises a configuration module 1011. The configuration module 1011 sets a default strength of the second optical signals to assure the data carried in the second optical signals are successfully received by the transceiving module 104.

In one embodiment, the circular polarizer 101 divides the received optical signals to the second optical signals according to the default strength, and divides remainder of the received optical signals to the first optical signals when the strength of the second optical signals reaches the default strength.

In another embodiment, the circular polarizer 101 sets a division ratio according to the default strength, and divides the received optical signals to the first optical signals and the second optical signals according to the division ratio.

The photo detector 102 detects the first optical signals divided by the circular polarizer 101, and transmits the first optical signals to the optical electrical converter 103. In another embodiment, the photo detector 102 may be an optical diode or a photosensitive resistor to detect and transmit the first optical signals better.

The optical electrical converter 103 receives the first optical signals from the photo detector 102, and converts the first optical signals into first electrical signals. In one embodiment, the power of the first electrical signals is low, normally below 1 watt, which has no affect on the data carried by the second optical signals. It should be noted that, in the future, along with the development of the optical fiber technology, more remaining optical signals of the second optical signals may be converted into electrical signals.

In the embodiment, the optical fiber connector 10 mainly supports the electrical signals to drive the transceiving module 104. Other elements of the optical fiber connector 10 scarcely require the electrical signals. Thus, power energy required by the optical fiber connector 10 is substantially equal to that of the transceiving module 104.

The transceiving module 104 receives the first electrical signals from the optical electrical convertor 103, receives the second optical signals from the circular polarizer 101, and receives third electrical signals from the ports 300 of the optical communication device 30. Then, the first electrical signals are used to drive signal transmission of the transceiving module 104.

In detail, the transceiving module 104 includes an optical electrical converting circuit 1041 and an electrical optical converting circuit 1042. The optical electrical converting circuit 1041 converts the second optical signals into second electrical signals. The first electrical signals drive the transceiving module 104 to transmit the second electrical signals from the optical electrical converting circuit 1041 to the ports 300 of the optical communication device 30.

Further, the first group electrical signals drive the transceiving module 104 to transmit the third electrical signals from the ports 300 of the optical communication device 30 to the electrical optical converting circuit 1042. The electrical optical converting circuit 1042 converts the third electrical signals into third optical signals and transmits the third optical signals to the optical fiber 20.

In one embodiment, if the optical fiber connector 10 is a single-fiber bi-directional connector, then the transceiving module 104 receives the second optical signals and transmits the third optical signals by the single fiber. If the optical fiber connector 10 is a two-fiber bi-directional connector, then the transceiving module 104 receives the second optical signals from one of the two fibers and transmits the third optical signals to another one of the two fibers.

It should be noted that FIG. 2 only shows a main structure of the optical fiber connector 10. More circuits to adjust the optical or electrical signals, such as an amplifying circuit, or a filtering circuit, could be added to the structure of the optical fiber connector 10.

In one embodiment, the optical fiber connector 10 can convert surplus of the optical signals received from the optical fiber 20 into electrical signals, and use the electrical signals to drive signal transmission of the optical fiber connector 10, which decreases power energy requirement from the ports 300 of the optical communication device 30. Meanwhile, the optical fiber connector 10 decreases power energy waste of the optical signals, which satisfies power save requirement of communication devices which use the optical fiber connector 10.

Figure 3:
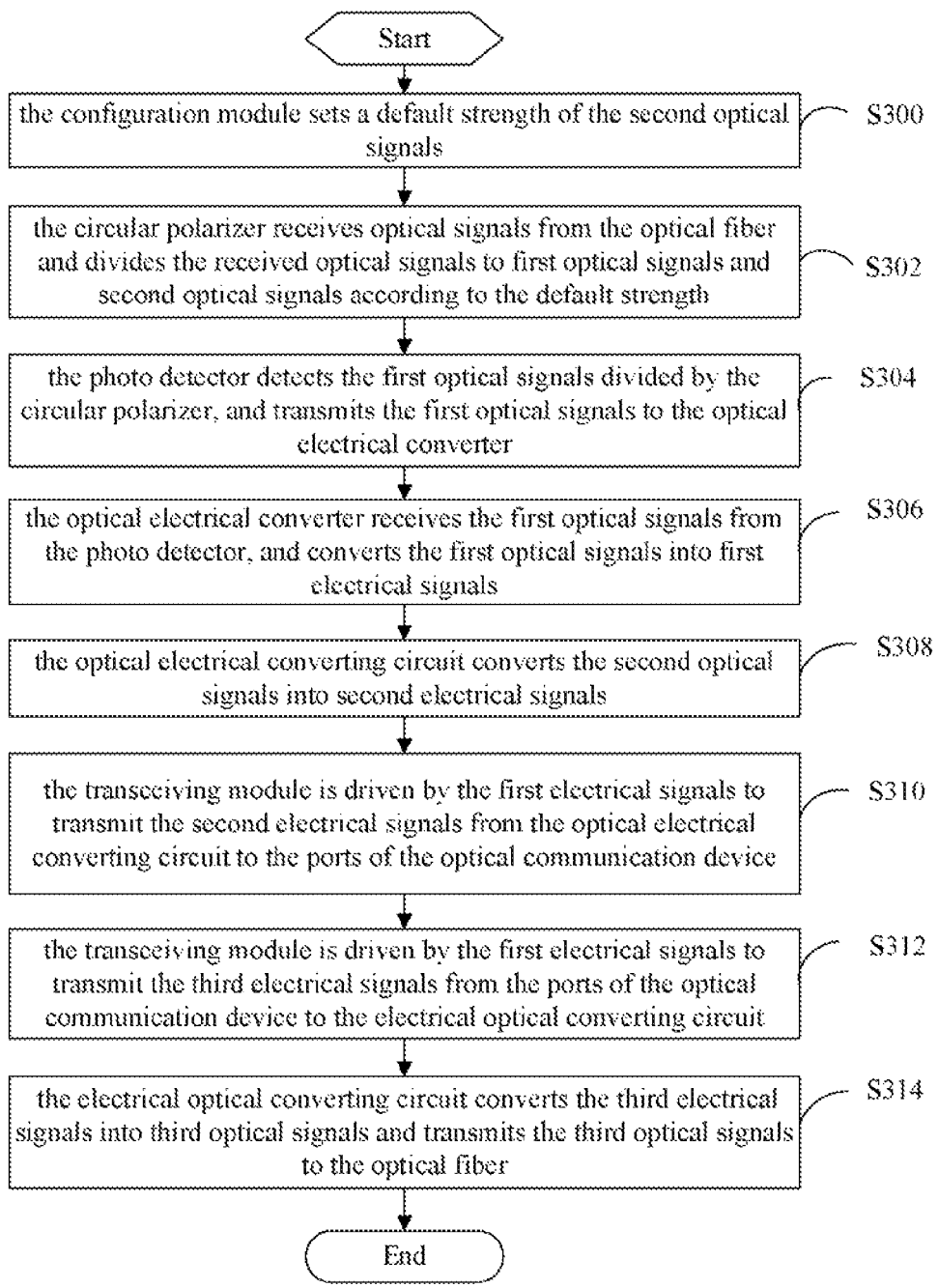
FIG. 3 is a flowchart of a working method of an optical fiber connector of one embodiment of the present disclosure.

FIG. 3 is a flowchart of a working method of the optical fiber connector 10 of one embodiment of the present disclosure. The flowchart is executed by the modules of the optical fiber connector 10 of FIG. 1. Depending on the embodiment, additional blocks may be added, others deleted, and the ordering of blocks may be changed while remaining well within the scope of the disclosure.

In block S300, the configuration module 1011 sets a default strength of the second optical signals to assure data carried in the second optical signals are successfully transmitted by the transceiving module 104. In block S302, the circular polarizer 101 receives optical signals from the optical fiber 20 and divides the received optical signals to first optical signals and second optical signals according to the default strength.

In block S304, the photo detector 102 detects the first optical signals divided by the circular polarizer 101, and transmits the first optical signals to the optical electrical converter 103. In block S306, the optical electrical converter 103 receives the first optical signals from the photo detector 102, and converts the first optical signals into first electrical signals.

In block S308, the optical electrical converting circuit 1041 converts the second optical signals into second electrical signals. In block S310, the transceiving module 104 is driven by the first electrical signals to transmit the second electrical signals from the optical electrical converting circuit 1041 to the ports 300 of the optical communication device 30.

In block S312, the transceiving module 104 is driven by the first electrical signals to transmit the third electrical signals from the ports 300 of the optical communication device 30 to the electrical optical converting circuit 1042. In block S314, the electrical optical converting circuit 1042 converts the third electrical signals into third optical signals and transmits the third optical signals to the optical fiber 20.

While various embodiments of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. An optical fiber connector connecting an optical fiber to ports of an optical communication device, the optical fiber connector comprising:
   a circular polarizer to receive external optical signals from the optical fiber and divide the received optical signals into first optical signals and second optical signals;
   an optical electrical converter to convert the first optical signals into first electrical signals;
   a transceiving module to receive third electrical signals from the ports of the optical communication device and comprising:
   an optical electrical converting circuit to convert the second optical signals into second electrical signals and transmit the second electrical signals to the optical communication device; and
   an electrical optical converting circuit to convert the third electrical signals into third optical signals and transmit the third optical signals to the optical fiber;
   wherein the first electrical signals are used to drive the transceiving module.

2. The optical fiber connector as claimed in claim 1, further comprising a photo detector to detect the first optical signals of the circular polarizer, and transmits the first optical signals to the optical electrical converter.

3. The optical fiber connector as claimed in claim 2, wherein the photo detector is an optical diode or a photosensitive resistor.

4. The optical fiber connector as claimed in claim 2, wherein the optical fiber connector is a single-fiber bi-directional connector, and the transceiving module receives the second optical signals and transmits the third optical signals by the single fiber.

5. The optical fiber connector as claimed in claim 2, wherein the optical fiber connector is a two-fiber bi-directional connector, and the transceiving module receives the second optical signals from one of the two fibers and transmits the third optical signals to another one of the two fibers.

6. The optical fiber connector as claimed in claim 2, wherein the circular polarizer comprises a configuration module to set a default strength of the second optical signals.

7. The optical fiber connector as claimed in claim 6, wherein the circular polarizer divides the external optical signals to the second optical signals according to the default strength, and divides remainder of the external optical signals to the first optical signals when the strength of the second optical signals reaches the default strength.

8. The optical fiber connector as claimed in claim 6, wherein the circular polarizer sets a division ratio according to the default strength, and divides the received optical signals to the first optical signals and the second optical signals according to the division ratio.

* * * * *